US008805742B2

(12) United States Patent  
Kim

(10) Patent No.: US 8,805,742 B2
(45) Date of Patent: Aug. 12, 2014

(54) METHOD AND SYSTEM FOR PROVIDING DRM LICENSE

(75) Inventor: Hyoung-shick Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1405 days.

(21) Appl. No.: 11/546,991

(22) Filed: Oct. 13, 2006

(65) Prior Publication Data

US 2007/0100763 A1    May 3, 2007

Related U.S. Application Data

(60) Provisional application No. 60/725,664, filed on Oct. 13, 2005.

(30) Foreign Application Priority Data

Aug. 7, 2006  (KR) ........................ 10-2006-0074285

(51) Int. Cl.
G06F 21/00 (2013.01)
H04L 29/08 (2006.01)

(52) U.S. Cl.
CPC .......... *G06F 21/00* (2013.01); *H04L 29/08072* (2013.01)
USPC ................ 705/59; 709/229; 726/26

(58) Field of Classification Search
USPC ................ 705/59; 709/229; 726/26
See application file for complete search history.

(56) References Cited

U.S. PATENT DOCUMENTS

| 7,552,122 | B1* | 6/2009 | Georgiev .............................. 1/1 |
| 2002/0112171 | A1* | 8/2002 | Ginter et al. ................... 713/185 |
| 2003/0005135 | A1* | 1/2003 | Inoue et al. ................... 709/229 |
| 2003/0126086 | A1 | 7/2003 | Safadi |
| 2005/0044391 | A1 | 2/2005 | Noguchi et al. |
| 2006/0089912 | A1* | 4/2006 | Spagna et al. ................... 705/51 |
| 2008/0244706 | A1* | 10/2008 | Lenoir et al. ................... 726/4 |

FOREIGN PATENT DOCUMENTS

| JP | 2000-293439 A | 10/2000 |
| JP | 2004-240960 A | 8/2004 |
| JP | 2004-303111 A | 10/2004 |
| KR | 2003-0097465 A | 12/2003 |
| KR | 2005-0032551 A | 4/2005 |
| WO | 03/034408 A2 | 4/2003 |
| WO | 2005/093544 A1 | 10/2005 |

OTHER PUBLICATIONS

Seki, A., et al., "Distributed Rights Circulation and Processing System Enabling Re-composition of Rights-condition and Preserving Derivation of Rights-relation", IPSJ SIG Technical Report, Nov. 2003, pp. 33-38.

Communication, dated Apr. 17, 2012, issued by the Japanese Patent Office in corresponding Japanese Application No. 2006-270915.

* cited by examiner

*Primary Examiner* — Tsan-Yu J Huang
(74) *Attorney, Agent, or Firm* — Sughrue Mion, PLLC

(57) ABSTRACT

A system for providing a digital rights management (DRM) license includes a sink system requesting a license for content, a source system generating and providing a plurality of sub-rights tokens, which include binding information having path information that indicates relations among a plurality of principals, in accordance with the request, and a rights mediator generating a main rights token by combining the plurality of sub-rights tokens and transmitting the generated main rights token to the system. The sink system determines whether to access the license which is bound to the principals on the basis of the main rights token.

19 Claims, 7 Drawing Sheets

METHOD AND SYSTEM FOR PROVIDING DRM LICENSE

CROSS-REFERENCE TO RELATED APPLICATIONS

This application claims priority from Korean Patent Application No. 10-2006-0074285 filed on Aug. 7, 2006 in the Korean Intellectual Property Office, and U.S. Provisional Patent Application No. 60/725,664, filed on Oct. 13, 2005 in the United States Patent and Trademark Office, the disclosures of which are incorporated herein by reference in their entireties.

BACKGROUND OF THE INVENTION

1. Field of the Invention

Systems and methods consistent with the present invention relate to a digital rights management license, and more particularly, to a method of binding a license of digital content using information about a path through which the license is transferred.

2. Description of the Related Art

The growth of the Internet and the development of multimedia technology have facilitated processes of distributing and acquiring digital content. However, if there is no way to protect the rights of such digital content, the development of such technology would lead to an illegal distribution of the digital content.

Recently, digital rights management (hereinafter referred to as "DRM") has been researched actively and commercial services using DRM have already been used or will be used. Here, DRM means software or hardware technology that limits the use of digital content only to a rightful user. Presently, most DRMs include techniques related to licenses and digital content. The license includes a set of rights that can be performed with respect to the digital content and content keys capable of decrypting the related content.

DRM is used because of the various characteristics provided by digital data. Digital content, unlike analog data, can be readily copied without loss, reused, processed and distributed to third parties, but a large amount of cost, effort and time are required to produce the digital content. Accordingly, if copying and distribution of digital content without permission are allowed, profits of digital content producers are compromised and the digital content provider's will to create is weakened, such that the activation of the digital content industry could be greatly hindered.

Some efforts have been made to protect the digital content. Conventionally, digital content protection has been concentrated on preventing access to digital content without permission. For example, only those people who have paid charges are permitted to access the digital content. However, when a person who has paid the charges accesses the digital content and intentionally distributes it to a third party, the third party can use the digital content without paying the charges, from which a number of problems have been caused.

In order to solve these problems, a concept of DRM has been introduced. In DRM, anyone is allowed to freely access encrypted digital content, but a license is needed to decrypt and execute the encrypted digital content. Accordingly, the digital content can be effectively protected by using the DRM.

FIG. 1 is an exemplary view schematically illustrating a concept of DRM. DRM mainly covers digital content protected by encryption or scrambling (hereinafter referred to as "encrypted content" in FIG. 1) and licenses for access to encrypted digital content.

In FIG. 1, there are a user 110 desiring to access digital content protected by DRM, a content issuer 120 providing the digital content, a license issuer 130 issuing licenses that include rights to access the digital content, and a certification authority 140 issuing certificates.

From the content issuer 120, the user 110 can obtain desired digital content that has encrypted content protected by DRM. The user 110 can obtain a license that can execute the encrypted content from the license issuer 130. The user 110 having the license can execute the encrypted content.

The certification authority 140 issues a certificate indicating that the content issuer 120 and the user 110 are rightful users. The certificate can be stored in each device when the device is manufactured. However, the certificates issued from the certification authority 140 may be revoked before they expire. As described above, DRM can protect the profits of digital content producers or issuers to render help in activating the digital content industry.

Generally, in order to prevent a license (or digital content) from being used by an illegal device or user, it is bound to the device or user. "Binding" means a concept that limits the playback (or access) of digital content to a specified device or user through an encryption technique so that no device or user, except for the specified device or user, can play (or access) the content. As shown in FIG. 2, most conventional DRMs bind a license (or digital content) to a content user, a player playing the content, a set of users using the content, a set of players, and others, using binding keys.

FIG. 2 illustrates digital content and a content issuer 210 issuing licenses for the digital content. The subject providing digital content and the subject providing licenses may differ. However, for convenience in explanation, it is considered that the same subject provides both digital content and licenses.

Referring to FIG. 2, the content issuer 210 may provide a DRM license by encrypting a content encryption key (CEK) using a binding key Ku for a set of users 220 using the content S201, encrypting the CEK using binding keys Ku_1, Ku_2, Ku_3 and Ku_4 for respective content users 222, 224, 226 and 228 using the content S202, encrypting the CEK using a binding key Kd for a set of players 230 using the content S203, or encrypting the CEK using binding keys Kd_1, Kd_2, Kd_3, Kd_4, Kd_5 and Kd_6 for respective players 231, 232, 233, 234, 235 and 236 using the content S204. In this case, CEK indicates a key for encrypting the digital content.

In the above-described binding structure, a requirement of the content issuer 210 will now be explained with reference to FIGS. 3a and 3b.

Referring to FIG. 3a, it is assumed that the first to fourth content users 222, 224, 226 and 228 possess the first player 231, third player 233, fourth player 234 and sixth player 236, respectively, and the four content users 222, 224, 226 and 228 share the second player 232 and fifth player 235.

In this case, if the content issuer 210 intends to limit the use of content 215 through the shared second player 232 and fifth player 235 only to the first content user 222 and second content user 224, such a requirement of the content issuer cannot be satisfied under the above-described binding structure.

Specifically, as shown in FIG. 3b, in the case in which the first content user 222 and the second content user 224 are in a single domain 330, and a DRM license is provided by encrypting the CEK using a binding key Ka S310 for this domain, the first content user 222 and the second content user 224 can use the content 215 through the first player 231 and the third player 233 since the first content user 222 and the second content user 224 possess the first player 231 and the third player 233, respectively. This is contradictory to the requirement of the content issuer 210.

Also, in the case in which the second player 232 and the fifth player 235 are in a single domain 340, and a DRM license is provided by encrypting the CEK using a binding key Kb S320 for this domain, the third content user 226 and the fourth content user 228 can use the content 215 through the second player 232 and the fifth player 235 since the third content user 226 and the fourth content user 228 share the second player 232 and the fifth player 235, respectively. In the same manner, this result is contradictory to the requirement of the content issuer 210.

As described above, the conventional binding method follows a device binding method or a user binding method that considers only the subject using the license (e.g., a content user or a set of users using the content) or the object (e.g., a player playing the content or a set of players), and thus the use range of the digital content is limited.

In addition, according to the conventional technique, the DRM system issuing DRM licenses on the content issuer side and the DRM system decrypting and playing encrypted content on the player side should be the same DRM system.

SUMMARY OF THE INVENTION

Accordingly, the present invention has been made to address problems occurring in the prior art, and an aspect of the present invention is to provide use ranges of digital content in diverse forms, without binding a license only to subjects using the license or objects, in a DRM environment.

It is another aspect of the present invention to provide a method capable of using a DRM license even among different DRM systems.

Additional aspects of the invention will be set forth in part in the description which follows and in part will become apparent to those having ordinary skill in the art upon examination of the following or may be learned from practice of the invention.

In an exemplary embodiment, a system for providing digital rights management (DRM) license is provided. The system includes a sink system requesting a license for content, a source system generating and providing a plurality of sub-rights tokens, which include binding information having path information that indicates relations among a plurality of principals, in accordance with the request, and a rights mediator generating a main rights token by combining the plurality of sub-rights tokens and transmitting the generated main rights token to the system, wherein the sink system determines whether to access the license bound to the principals on the basis of the main rights token.

In another exemplary embodiment of the present invention, there is provided a method of providing digital rights management (DRM) license. The method includes (a) requesting a license for content, (b) generating a plurality of sub-rights tokens, which include binding information having path information that indicates relations among a plurality of principals, in accordance with the request, (c) generating a main rights token by combining the plurality of sub-rights tokens generated, and (d) determining whether to access the license bound to the principals on the basis of the generated main rights token.

BRIEF DESCRIPTION OF THE DRAWINGS

The above aspects of the present invention will become more apparent by describing in detail exemplary embodiments thereof with reference to the attached drawings, in which.

DETAILED DESCRIPTION OF EXEMPLARY EMBODIMENTS

Figure 1:
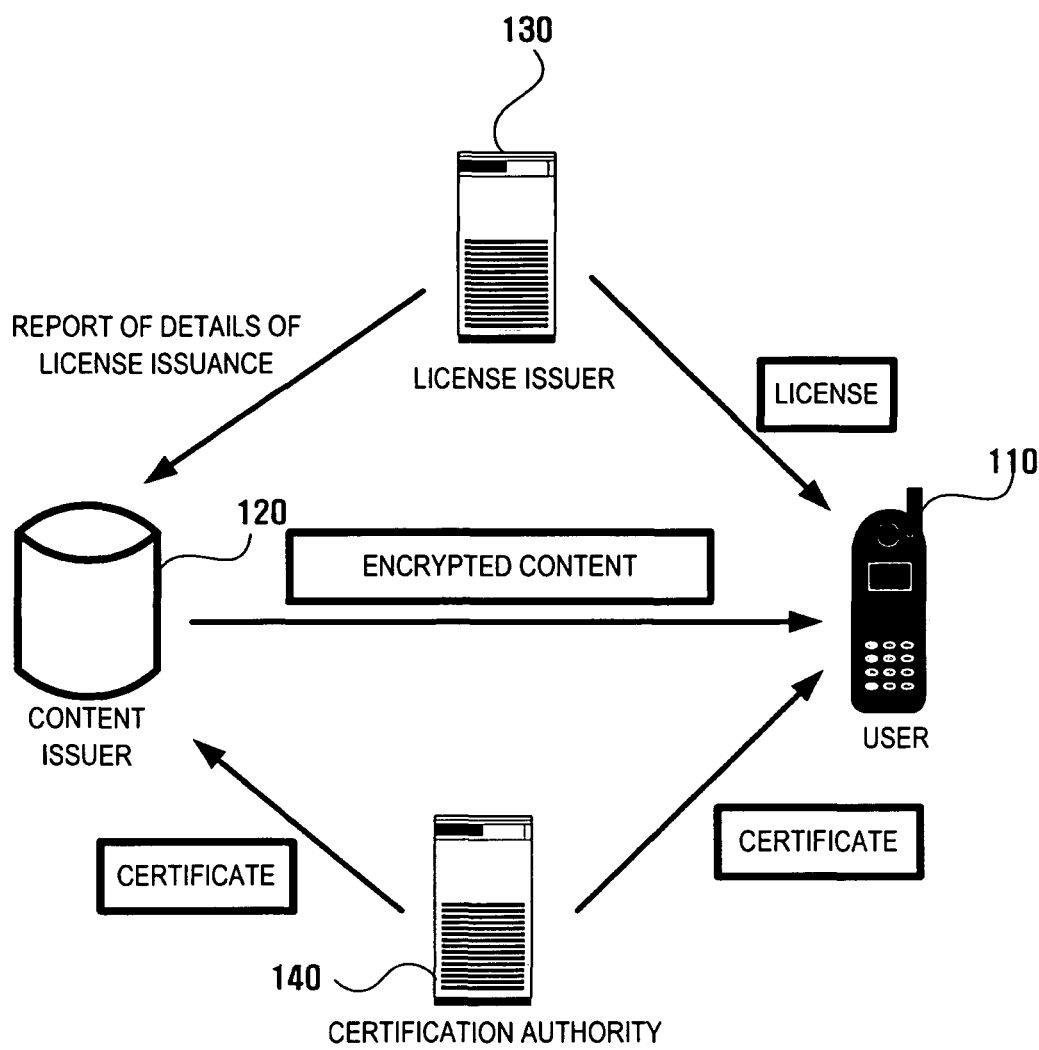
FIG. 1 is an exemplary view schematically illustrating a concept of DRM.
Figure 2:
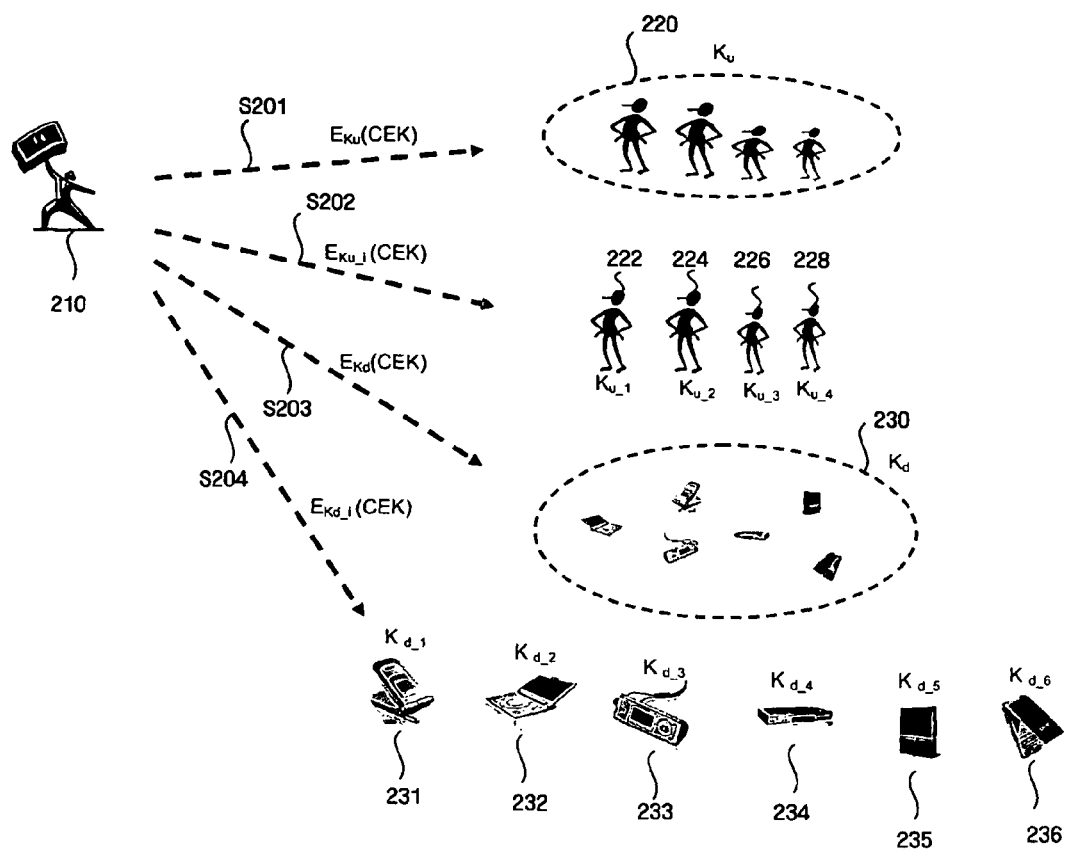
FIG. 2 is an exemplary view illustrating a conventional binding method.
Figure 3A:
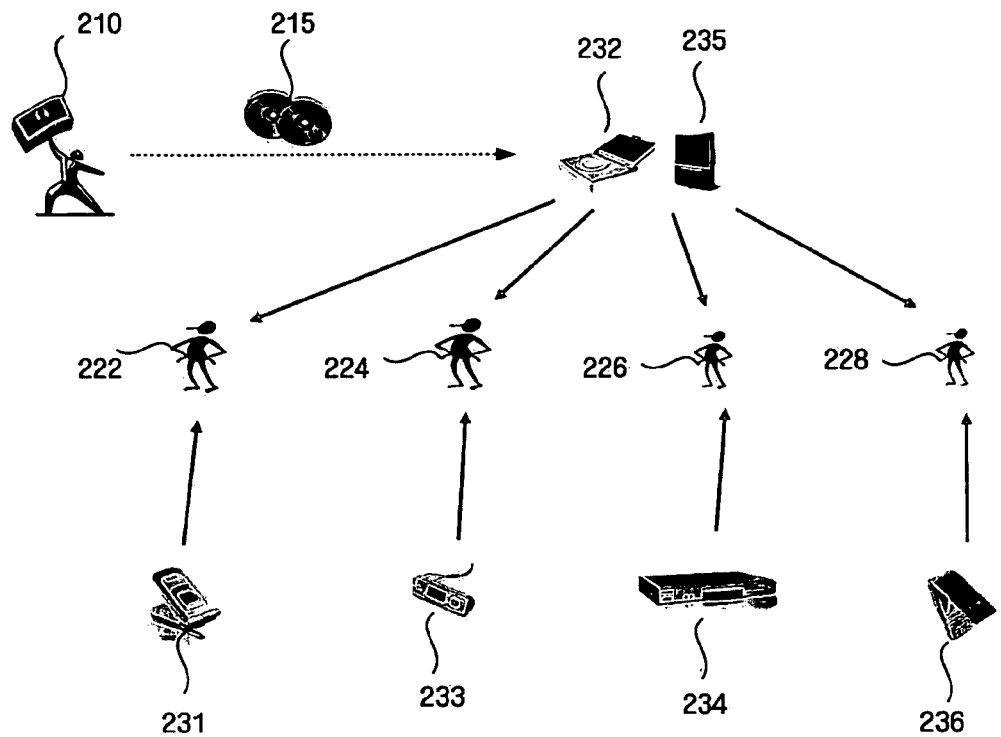
FIGS. 3a and 3b are exemplary views explaining problems of a conventional binding method.
Figure 3B:
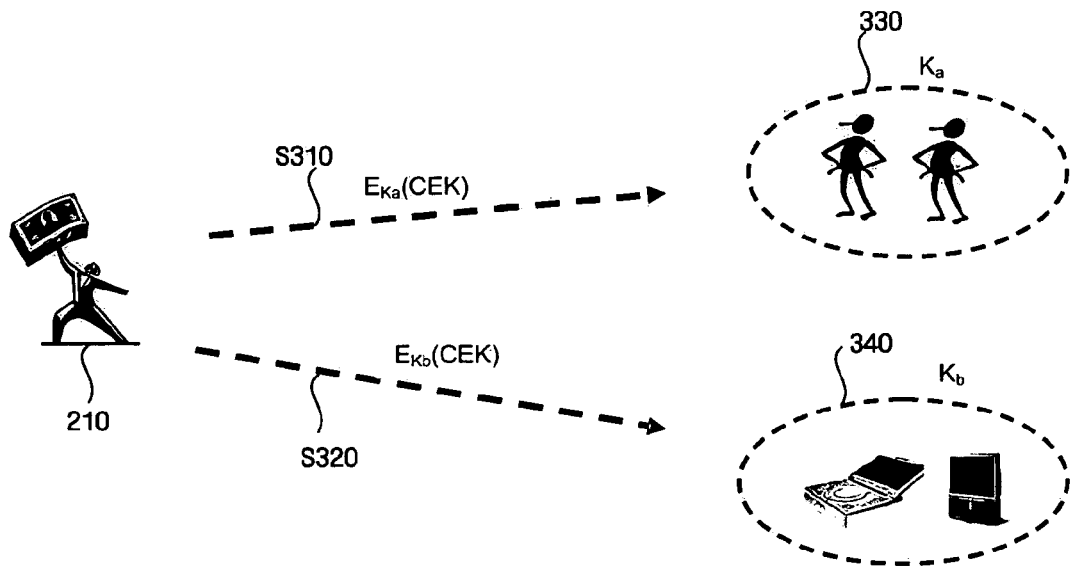

Hereinafter, exemplary embodiments of the present invention will be described in detail with reference to the accompanying drawings. Aspects and features of the present invention and methods for achieving the aspects and features will be apparent by referring to the exemplary embodiments which are described with reference to the accompanying drawings. However, the present invention is not limited to the embodiments disclosed hereinafter, but can be implemented in diverse forms. Same drawing reference numerals are used for the same elements across various figures.

The present invention will now be described with reference to the accompanying drawings illustrating block diagrams and flowcharts for explaining a method and system for providing a DRM license according to exemplary embodiments of the present invention. It will be understood that blocks of the flowchart illustrations, and combinations of blocks in the flowchart illustrations, may be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 4:
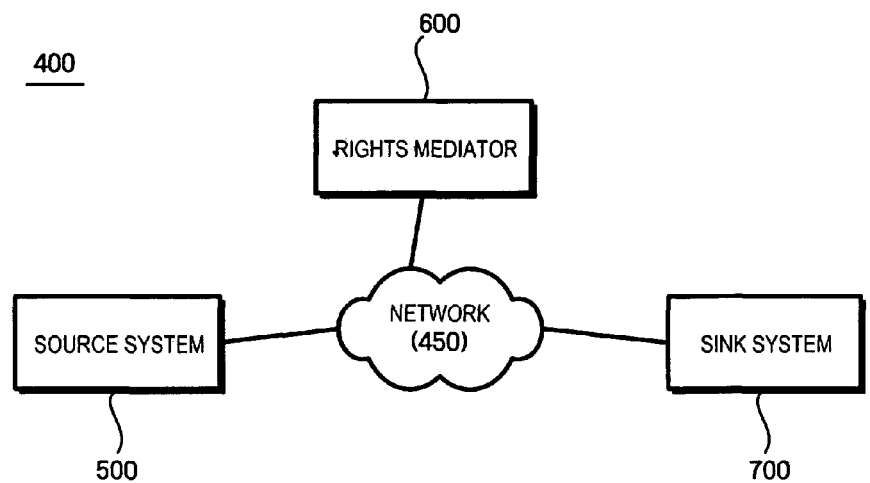
FIG. 4 is a view illustrating a system for providing a DRM license according to an exemplary embodiment of the present invention.

FIG. 4 is a view illustrating a system for providing a DRM license according to an exemplary embodiment of the present invention.

Referring to FIG. 4, a system for providing a DRM license 400 includes a source system 500, a sink system 700, a rights mediator 600, and a network 450 connecting the source system 500, the sink system 700 and the rights mediator 600.

The source system 500, which is a system that transmits content, generates a DRM license and encrypted content.

The sink system 700, which is a system that receives and uses the content from the source system 500, uses the DRM license and decrypts the encrypted content. The sink system 700 may be divided into use subjects using the sink system 700 and use objects such as players. For example, the sink system 700 may be constituted by all audio/video (AV) players belonging to a user's home network, a specified mobile device, or a user's family. Hereinafter, use subjects or use objects that constitute the sink system 700 will be called "principals".

The principals in the sink system 700 may be differently managed according to a model implementing the sink system 700. For example, information related to a specified user may be stored in a PC, a smart card and a portable phone, or may be managed in the form of an account-password.

The rights mediator 600 means a system that converts or re-processes the DRM license provided from the source system 500 into the form of a DRM license that can be understood in the sink system 700.

For example, in the case in which the source system 500 is provided with an "A" DRM system and the sink system 700 is provided with a "B" DRM system, the sink system 700 cannot understand the DRM license generated from the source system 500. Accordingly, a DRM license that can be understood by both the source system 500 and the sink system 700 is required, and in the present invention, such a DRM license will be called a "rights token".

Specifically, when the source system 500 generates and provides a plurality of rights tokens related to the encrypted content, the rights mediator 600 generates a rights token using the plurality of rights tokens and provides the generated rights token to the sink system 700. In this case, in order to discriminate between types of rights tokens, a rights token provided by the source system 500 is called a "sub-rights token", and a rights token generated by the rights mediator 600 and provided to the sink system 700 is called a "main rights token".

Figure 5:
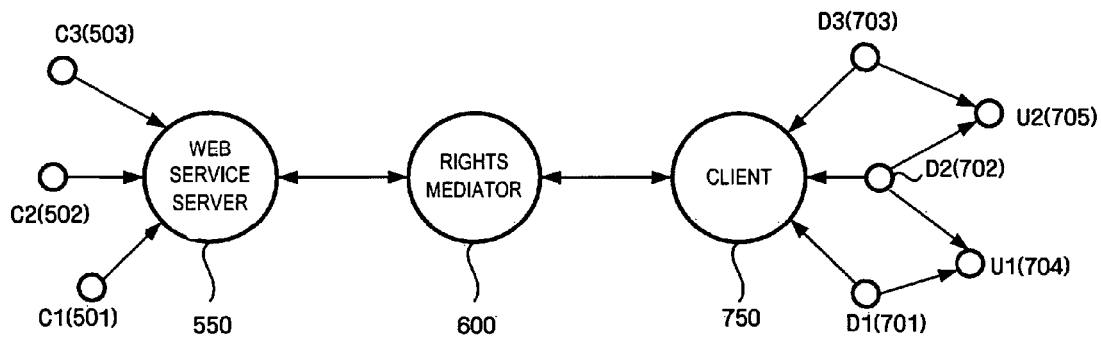
FIG. 5 is a view illustrating the detailed construction of the DRM license providing system according to an exemplary embodiment of the present invention.

FIG. 5 is a view illustrating the detailed construction of the DRM license providing system according to an exemplary embodiment of the present invention.

Referring to FIG. 5, the source system 500 manages a plurality of content 501, 502 and 503 and DRM licenses for the respective content, and includes a web service server 550 generating the sub-rights tokens. The sink system 700 includes a plurality of principals 701, 702, 703, 704 and 705 and a client 750 receiving the main rights token through the rights mediator 600. Although the client 750 can receive the encrypted content directly from the web service server 550, it may receive the content via the rights mediator 600.

In this case, the respective principals constituting the sink system 750 may be constructed in the form of a topology that indicates the relations among the principals. For example, referring to FIG. 5, on the assumption that U1 704 and U2 705 are use subjects and D1 701, D2 702 and D3 703 are use objects, U1 704 can play the content through D1 701 and D2 702. Also, D1 701, D2 702 and D3 703 are constructed to belong to a domain managed by the client 750. Accordingly, the topology of the principals can be determined by edges connecting the respective principals. When a principal A that indicates use subjects by a single edge is connected to a principal B that indicates use objects, if an arrow of the edge faces the principal A, i.e., "A→B", the principal A can also play content in the principal B.

Figure 6:
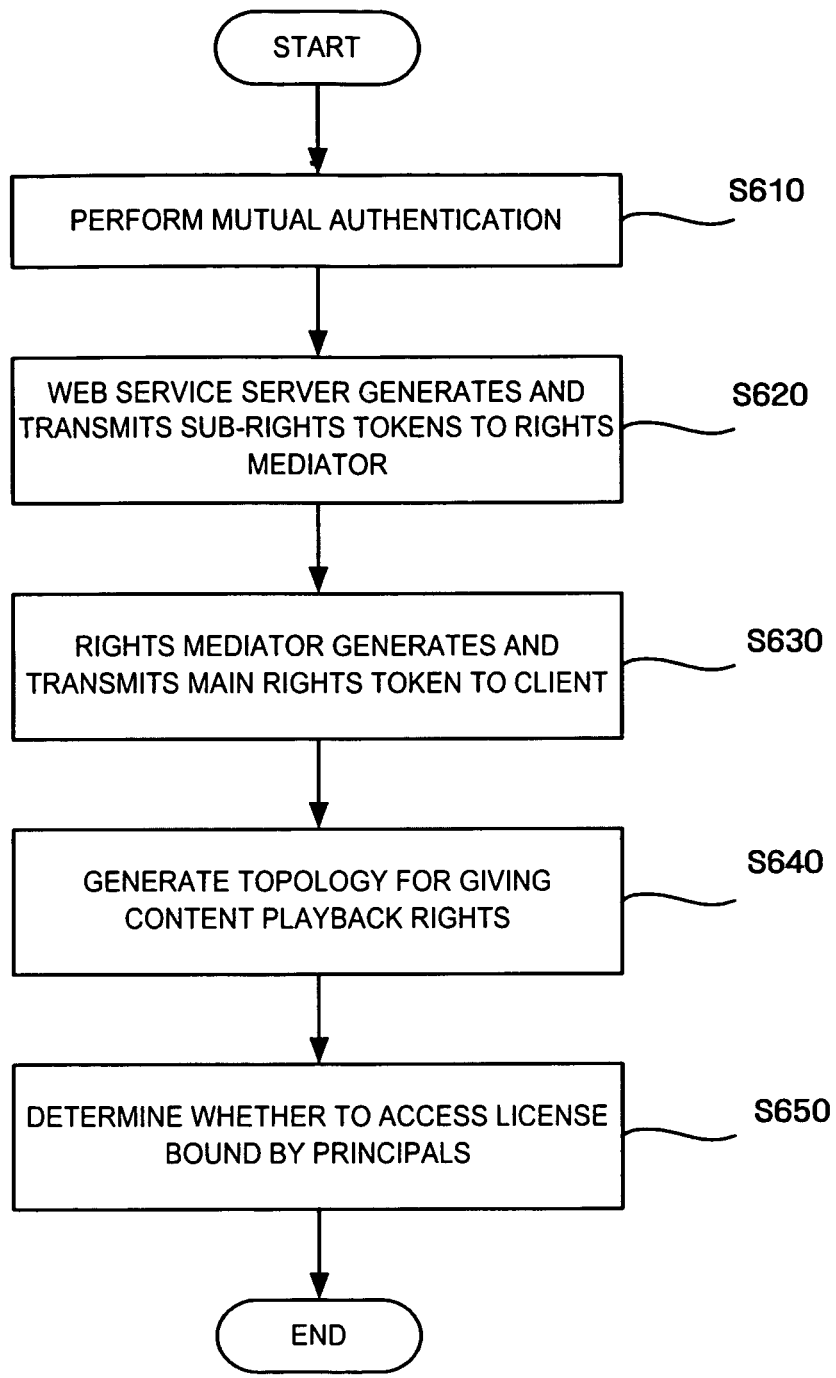
FIG. 6 is a flowchart illustrating a method of providing a DRM license according to an exemplary embodiment of the present invention.

The operation of the respective constituent elements illustrated in FIG. 5 will now be explained in detail with reference to a flowchart illustrated in FIG. 6.

When the client 750 requests a license for specified content from the web service server 550, the web service server 550 performs a mutual authentication to confirm whether the client 750 is a rightful client through a certificate, content purchase information of the sink system or a client's access information, such as an IP address, an account and a password in S610.

If it is confirmed that the client 750 is a rightful client, the web service server 550 generates and provides a sub-rights token for the requested content to the right mediator 600 in S620. The content requested by the client 750 may be encrypted by the web service server 550 to be provided to the client.

In this case, the sub-rights token includes binding information of the content requested by the client 750 and rights information of the requested content. Conventionally, such binding information is expressed as a specified principal. In an exemplary embodiment of the present invention, the binding information can be expressed as path information among a plurality of principals, not by a single principal. The path information is information about edges connecting the principals.

In addition, the web service server 550 can generate and provide a plurality of sub-rights token. In this case, each sub-rights token includes the path information among the plurality of principals as the binding information. If the web service server 550 generates and provides the plurality of sub-rights tokens to the rights mediator 600, the rights mediator 600 generates one main rights token by combining the plurality of sub-rights tokens, and then transmits the generated main rights token to the client 750 in S630. In this case, the main rights token includes relation information indicating relations among binding information or rights information included in the respective sub-rights tokens, and through this relation information, operations among the respective binding information or rights information, such as difference set, set intersection and union, become possible. For example, if the relation information between the first binding information included in the first sub-rights token and the second binding information included in the second sub-rights token indicates the set intersection, it can be understood that content playback rights are given to the principals belonging to a common path of the path information corresponding to the first binding information and the path information corresponding to the second binding information.

The relation information may be generated by the web service server 550 and then provided to the rights mediator 600.

The client 750 can generate a topology for giving the content playback rights on the basis of the main rights token received from the rights mediator 600 in S640.

That is, since the main rights token includes the path information about a plurality of paths and the relation information among the respective path information, one topology, such as a tree structure, can be generated on the basis of the path information and the relation information.

The client 750 can determine whether to access the license bound by principals that constitute the sink system 700 through the topology generated as above S650.

Figure 7:
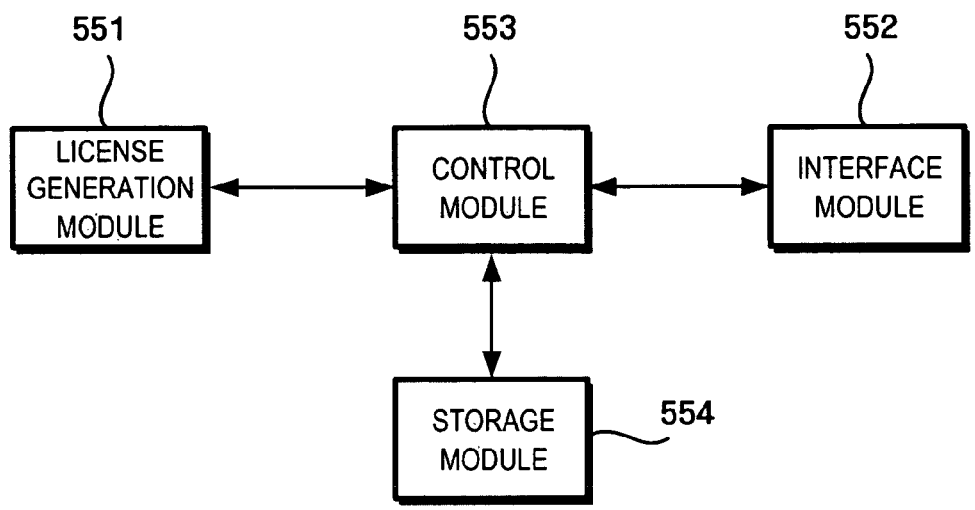
FIG. 7 is a view illustrating the construction of a web service server according to an exemplary embodiment of the present invention.

FIG. 7 is a view illustrating the construction of a web service server according to an exemplary embodiment of the present invention.

Referring to FIG. 7, the web service server 550 according to the exemplary embodiments of the present invention includes an interface module 552 communicating with the client 750 or the rights mediator 600, a license generation module 551 generating the sub-rights tokens for the content requested by the client 750, a storage module 554 storing the content requested by the client 750 or the binding information for the requested content, and a control module 553 controlling the operation of the respective modules.

The modules used in the exemplary embodiments of the present invention include software or hardware elements, such as a field-programmable gate array (FPGA) or an application-specific integrated circuit (ASIC), to perform a specific function. Modules, however, are not defined as software or hardware. Modules may be configured in an addressable storage medium, or configured to reproduce one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for-in the components and modules may be combined into fewer components and modules or further separated into additional components and modules.

When the interface module 552 receives the content and the license request for the content from the client 750, the control module 553 searches the storage module 554, encrypts the requested content, and transmits the encrypted content to the client 750 through the interface module 552.

In addition, the control module 553 provides the binding information stored in the storage module 554 to the license generation module 551, and the license generation module 551 generates the sub-rights tokens by using the binding information and provides the generated sub-rights tokens to the control module. In this case, the binding information may be expressed as the path information that indicates the relations among the plurality of principals. The control module 553 transmits the generated sub-rights tokens to the rights mediator 600 through the interface module 552.

Figure 8:
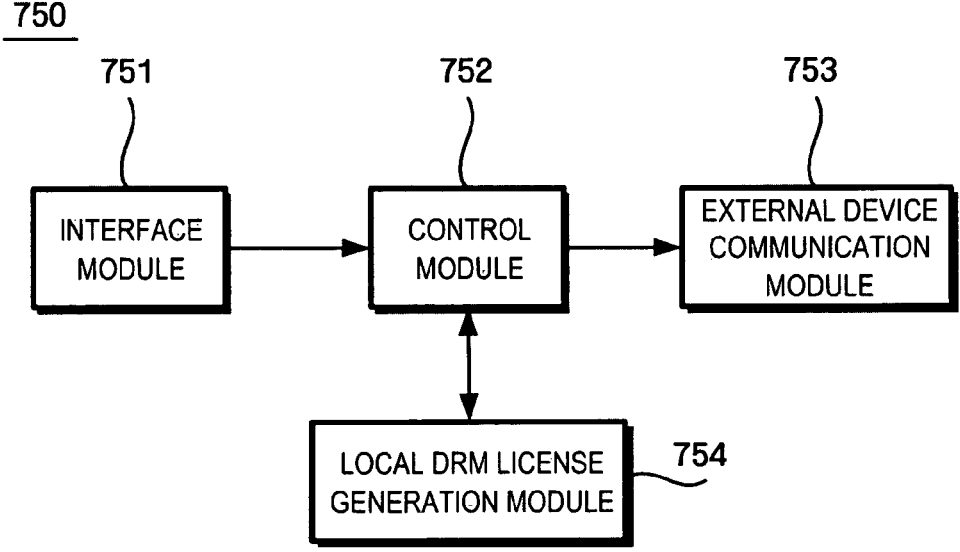
FIG. 8 is a view illustrating the construction of a client according to an exemplary embodiment of the present invention.

FIG. 8 is a view illustrating the construction of a client according to an exemplary embodiment of the present invention.

Referring to FIG. 8, the client 750 includes an interface module 751 communicating with the web service server 550 or the rights mediator 600, a local DRM license generation module 754 converting the main rights token received from the rights mediator 600 into the form of a DRM license installed in the client 750, an external device communication module 753 providing the main rights token to use subjects or use objects that constitute the sink system, and a control module 752 controlling the operation of the respective modules.

When, the interface module 751 receives the main rights token from the rights mediator 600, the control module 752 generates a topology for giving the content playback rights on the basis of the main rights token. Then, the control module 752 determines whether to access the license bound by principals that constitute the sink system by using the generated topology, and on the basis of this, controls the local DRM license generation module 754 to generate the license that can be understood by the DRM license system installed in the client 750.

In addition, the control module 752 may provide the main rights token received from the rights mediator 600 through the external device communication module 753 to the use subject or the use object, or convert the main rights token into a license form suitable for the use subject or the use object.

Figure 9A:
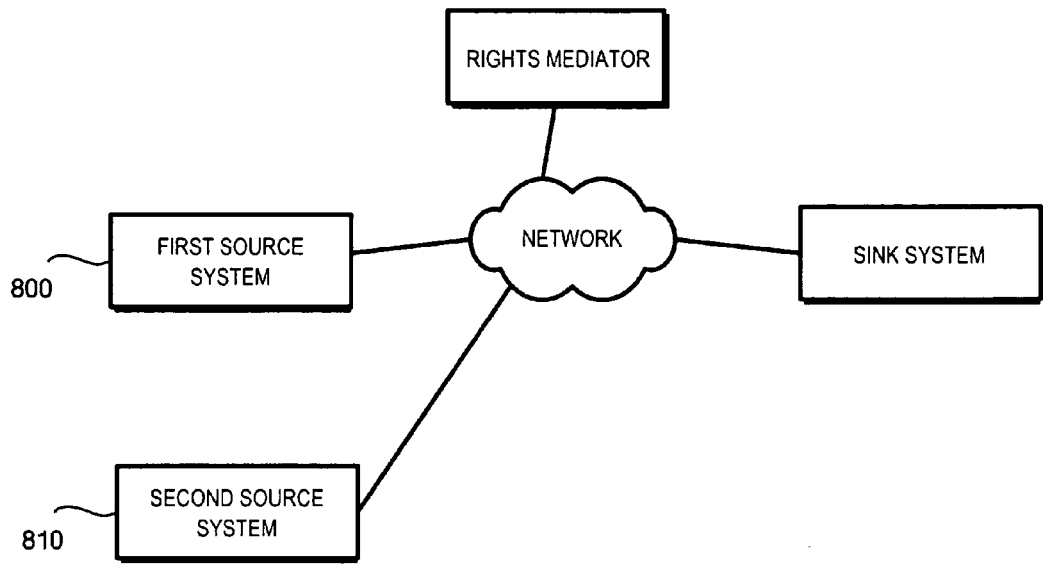
FIGS. 9a and 9b are views illustrating systems for providing a DRM license according to other exemplary embodiments of the present invention.
Figure 9B:
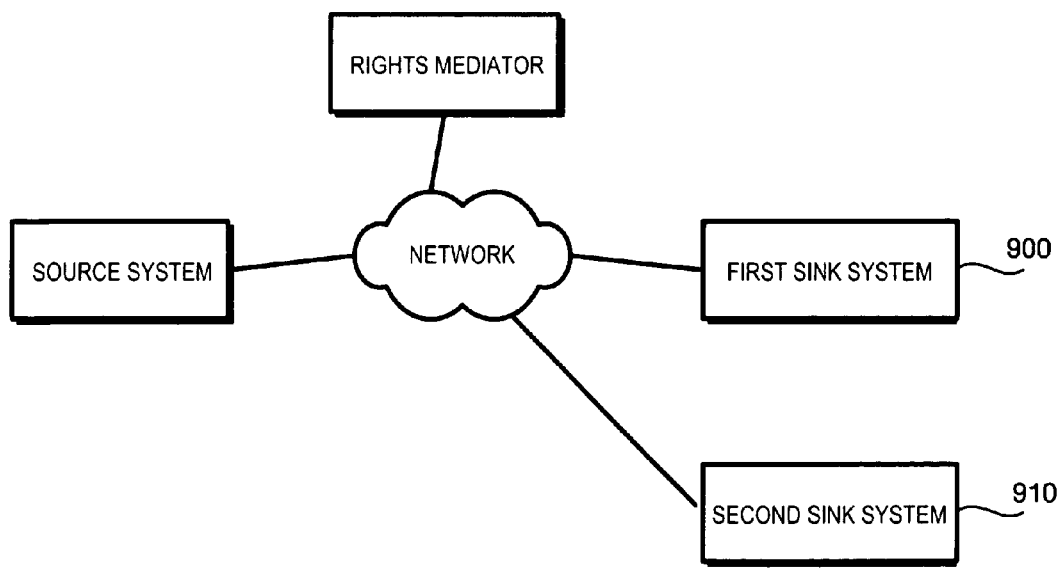

Although FIG. 4 illustrates the DRM license providing system including one source system 500 and one sink system 700, the exemplary embodiments of the present invention are not limited thereto, and the DRM license providing system may include a plurality of source systems 800 and 810 and a plurality of sink systems 900 and 910, as illustrated in FIGS. 9a and 9b.

If a plurality of source systems exist, the rights mediator can generate one main rights token by combining the sub-rights tokens received from the respective source systems, and in this case, the generated main rights token may include information indicating relations among the source systems.

As described above, according to the exemplary embodiments of the present invention, the use range of the digital content can be provided in diverse forms, and the DRM license can be used among different DRM systems.

In addition, the exemplary embodiments of the present invention can satisfy the requirement of the content issuer desiring the use of the digital content in diverse forms.

The exemplary embodiments of the present invention have been described with reference to the accompanying drawings. However, those skilled in the art will appreciate that many variations and modifications can be made to the disclosed embodiments without substantially departing from the principles of the present invention. Therefore, the disclosed embodiments of the invention are used in a generic and descriptive sense only and not for purposes of limitation.

What is claimed is:

1. A system for providing a digital rights management (DRM) license, the system comprising:
   a sink system which requests a license for content;
   a source system which generates and provides a plurality of sub-rights tokens, each of the plurality of sub-rights tokens include binding information having path information that indicates relations among a plurality of principals, in accordance with the request; and
   a rights mediator computer which generates a main rights token by combining the plurality of sub-rights tokens and transmits the main rights token to the sink system,
   wherein the sink system determines whether to access the license which is bound to the principals on the basis of the main rights token, and
   wherein the sink system is a system that generates a topology which gives content playback rights on the basis of the main rights token which is transmitted, and which determines whether to access the license which is bound to the principals constituting the sink system on the basis of the topology which is generated.

2. The system of claim 1, wherein the main rights token comprises information indicating relation operations among the plurality of sub-rights tokens.

3. The system of claim 1, wherein the plurality of principles comprises use subjects which use the content and use objects which play the content.

4. The system of claim 1, wherein the rights mediator is a mediator which further determines whether the sub-rights tokens from different source systems are received, and which generates the main rights token by combining the sub-rights tokens received from the source systems respectively, and the main rights token comprises information indicating relations among the source systems.

5. The system of claim 1, wherein the source system comprises a web service server which manages a plurality of content and DRM licenses for the plurality of content and generates the sub-rights tokens.

6. The system of claim 1, wherein the sink system comprises a client which receives the plurality of principals and the main rights token from the rights mediator.

7. A method of providing a digital rights management (DRM) license, the method comprising:
   (a) requesting a license for content;
   (b) generating a plurality of sub-rights tokens, each of the plurality of sub-rights tokens include binding information having path information that indicates relations among a plurality of principals, in accordance with the requesting;
   (c) generating by a computer a main rights token by combining the plurality of sub-rights tokens which are generated; and
   (d) determining whether to access the license which is bound to the principals on the basis of the main rights token which is generated,
   wherein said (d) comprises:
      generating a topology for giving content playback rights on the basis of the main rights token which is generated; and
      determining whether to access the license which is bound to the principals constituting the sink system on the basis of the generated topology.

8. The method of claim 7, wherein the main rights token comprises information indicating relation operations among the plurality of sub-rights tokens.

9. The method of claim 7, wherein the principles comprise use subjects using the content and use objects playing the content.

10. The method of claim 7, further comprising:
    receiving the sub-rights tokens from different source systems,
    generating the main rights token by combining the sub-rights tokens received from the source systems respectively,
    wherein the main rights token comprises information indicating relations among the different source systems.

11. The method of claim 7, wherein the path information is information about edges connecting the principals.

12. The method of claim 7, wherein the generating the main token comprises combining the path information of plurality of different sub-rights tokens and wherein the main token further comprises relation information for the combined path information.

13. The method of claim 12, further comprising generating a tree structure solely from the plurality of path information and the relation information provided in the main token.

14. The method of claim 13, further comprising providing content playback rights for principals belonging on a common path of the plurality of path information in the main token.

15. The method of claim 7, wherein a first sub-rights token of the plurality of sub-rights tokens is a license for one part of the content and a second sub-rights token of the plurality of sub-rights tokens is a license to another part of the content.

16. The system of claim 1, wherein the rights mediator determines whether the sub-rights tokens are from different source systems, and converts the sub-rights tokens into a format of the sink system and generates the main rights token in the format of the sink system.

17. A non-transitory computer readable medium storing a computer program comprising instructions for providing a digital rights management (DRM) license executed by a processor to perform operations of:
    receiving a request for a content license;
    generating and providing a plurality of sub-rights tokens, each of the plurality of sub-rights tokens include binding information having path information that indicates relations among a plurality of principals, in accordance with the request; and
    generating a main rights token by combining the plurality of sub-rights tokens,
    wherein a sink system determines whether to access the license which is bound to the principals on the basis of the main rights token, and
    wherein the sink system is a system that generates a topology which gives content playback rights on the basis of the main rights token which is transmitted, and which determines whether to access the license which is bound to the principals constituting the sink system on the basis of the topology which is generated.

18. The system of claim 1, wherein each of the plurality of sub-rights tokens include binding information having path information comprising at least one intermediate principal and that indicates relations among a plurality of principals connected by the at least one intermediate principal.

19. The method of claim 7, further comprising:
    determining whether the sub-rights tokens are from different source systems, and
    based on whether or not the sub-rights tokens are determined to be from different source systems, converting the sub-rights tokens into a format of the sink system and generating the main rights token in the format of the sink system.

* * * * *